Jan. 3, 1950      L. A. GEISTERT      2,493,485
ROLLER MOUNTING FOR VERTICAL DISPENSERS

Filed Oct. 14, 1947      2 Sheets-Sheet 1

INVENTOR.
LEWIS A. GEISTERT

Jan. 3, 1950     L. A. GEISTERT     2,493,485
ROLLER MOUNTING FOR VERTICAL DISPENSERS

Filed Oct. 14, 1947     2 Sheets-Sheet 2

INVENTOR.
LEWIS A. GEISTERT
BY

Patented Jan. 3, 1950

2,493,485

UNITED STATES PATENT OFFICE 2,493,485

ROLLER MOUNTING FOR VERTICAL DISPENSERS

Lewis A. Geistert, Grand Rapids, Mich., assignor to Simplex Display Fixture Company, Grand Rapids, Mich., a corporation of Michigan Application October 14, 1947, Serial No. 779,777

4 Claims. (Cl. 242—55.3)

This invention relates to a bearing structure for a dry goods displaying and dispensing rack and more particularly to such a device having rollers for carpet or linoleum rolls mounted upon a roller bearing assembly.

When a roller equipped dispenser is used for rolls of heavy merchandise, such as carpets and linoleum, the weight of the merchandise becomes a vital factor to be considered in the construction and design of the dispensing device. The mounting of the rollers determines both the amount of effort required to operate the dispenser and the length of its operating life. Where bearings have in the past been provided for such dispensers they have been narrow, causing excessive wear due to the load concentration and at the same time contributing little towards reduction of the operating friction.

Although dispensers having vertically tiered, free-running rollers have been known and used for many years in the merchandising field, and although much consideration has been given to the design of the roller mounts to reduce both the wear and the cost of replacement, nothing has hitherto been known effectively combining economy of manufacture with both durability and sufficient friction reduction to permit the dispenser to be used with an acceptable minimum of effort. A satisfactory bearing must meet the requirements of simplicity, low cost, durability and heavy duty capacity.

A further complication in the design of a satisfactory dispenser bearing is the fact that the center of load shifts materially during operation. This factor has not been solved where a friction reducing bearing has been employed in dispensers hitherto available with the result that the material supporting rollers may jump from their normal operating position, which both incapacitates the dispenser and endangers personnel where heavy rolls of material are involved, and at the very least such shift causes excessive wear on the bearing toward which the shift occurs.

A still further problem arises from the fact that the rolls of carpet, or linoleum, are initially heavy and yet are frequently handled by unskilled and careless personnel. Thus, the rollers are frequently, if not usually, dropped into place in the bearing supports rather than being laid carefully therein. This in the past has required that the bearing supports be able not only to support the normal weight of the carpet or linoleum roll, but also that they be able to support a substantial shock load, and this requirement has been thought to necessitate bearings of large and heavy construction. Often this has been so clumsy, or involved such space and cost requirements, that bearings have been omitted entirely in preference to meeting these conditions.

It is, therefore, a primary object of my invention to provide a bearing surface of sufficient size to distribute the load over a large area.

Another object of my invention is to provide a roll supporting mechanism utilizing bearings of only such size as to support the rolls with a reasonable factor of safety and yet wherein there is a minimum of risk incident to the shock of a roll being dropped onto the roll supporting mechanism.

A further object of my invention is to provide a bearing arrangement designed to provide support at substantially a right angle to the direction of the load when the merchandise is being unrolled.

It is a still further object of my invention to make the bearing easily and quickly replaceable.

Another object of my invention is to provide a bearing design which is both simple and economical to manufacture.

Other objects and purposes of my invention will be apparent to persons acquainted with equipment of this type upon examination of the accompanying drawings and reading of the following disclosure.

In fulfilling the objects and purposes of my invention I have provided a mounting for a heavy duty dispensing roller consisting of roller bearings having a large load supporting area removably installed in a supporting housing and so spaced that effective support is provided both when the material supporting shaft is being turned and when it is stationary.

Figure 1:
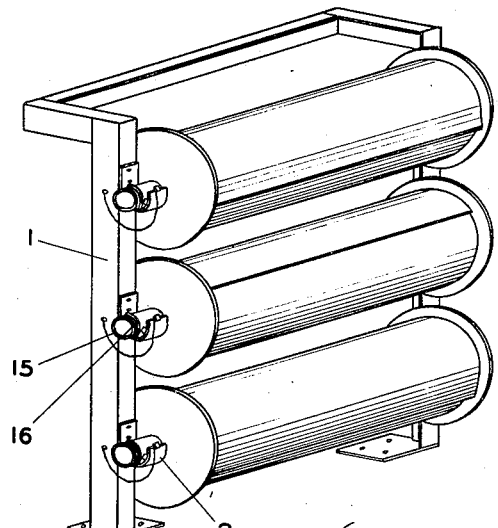
Figure 1 represents an oblique view of a vertical dispenser incorporating my invention.

Referring to the drawings in detail, the numeral 1 indicates a vertical frame member of a dry goods dispenser having a series of material rollers mounted thereon, preferably detachably, at substantially regular, preferably adjustable, intervals (Figure 1). The bearing housing 2, may be attached thereto, by welding, riveting or, preferably, by bolts 3 as shown. If bolts are used, it will be advantageous for reasons of stability to utilize a bolt having a non-circular shank fitted into similarly shaped openings in both the portion 4 of the bearing housing and the frame. The bearing housing 2 consists of a rectangular strip bent to form two straight, substantially parallel, portions 4 and 5 connected through a curved portion 6. The width and gage of the housing depends upon the load to which it is to be subjected, however, the width should, for the usual carpet and linoleum roll use, be at least 1½ inches and greater widths are preferable. On each side of the housing 2 and within the curved portion 6 of the housing are rails 7 having the form of a segment of a ring. These rails are welded or brazed to the housing 2.

Figure 2:
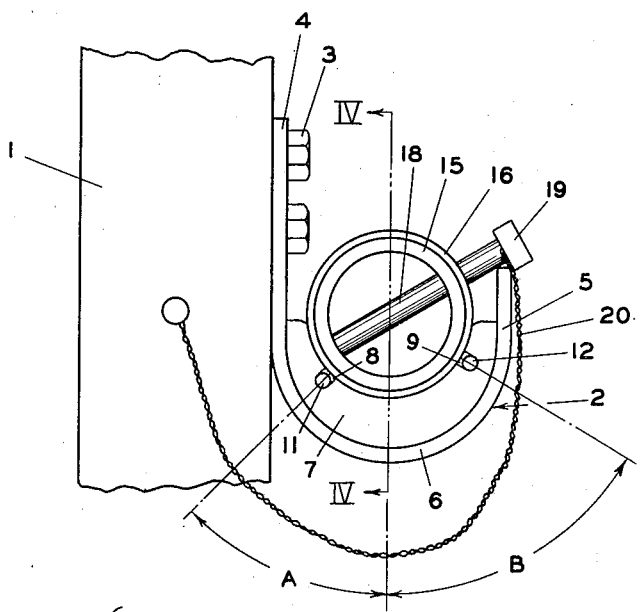
Figure 2 is a side elevational view of my bearing arrangement for the dispenser.
Figure 3:
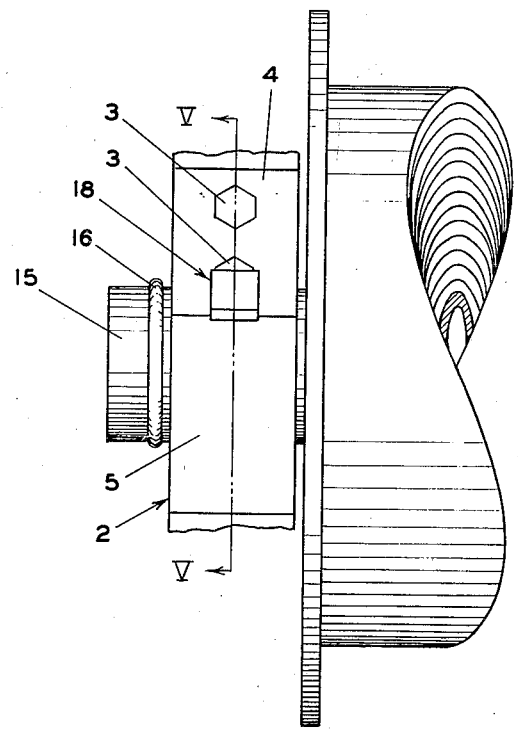
Figure 3 is a front elevational view of my bearing arrangement for the dispenser.
Figure 4:
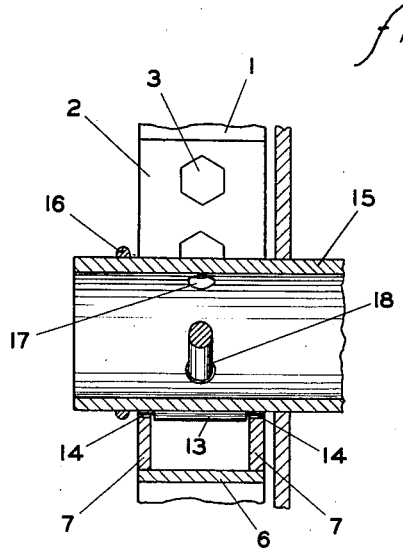
Figure 4 is a sectional elevational view of my bearing arrangement taken along the plane IV—IV of Figure 2.
Figure 5:
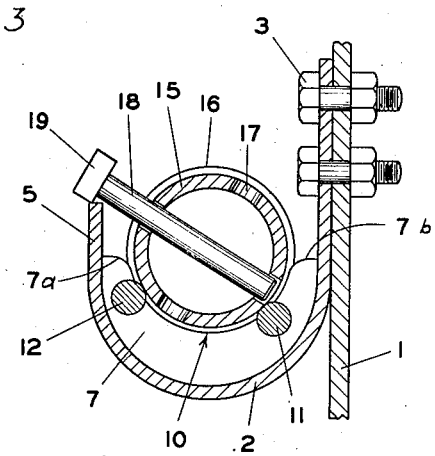
Figure 5 is a sectional elevational view of my bearing arrangement taken along the plane V—V of Figure 3 cutting all the parts except the pin and installation bolts.

A pair of slots, or other bearing receiving openings, 8 and 9 extend radially outward from the inner surface 10 of each of the rails 7 (Figures 2 and 5). The dimension "A" (Figure 5) for the slot 8 is approximately 45 degrees and the dimension "B" for the slot 9 is approximately 60 degrees. The purpose of this difference in position of the slots with respect to the vertical will appear more fully hereafter.

The respective ends of each of the rails are in substantially a horizontal plane, the same being substantially perpendicular to the plane of the frame, and are of width only a little, or no, less than the width of the rails in the region of the said slots. This provides substantial shoulders 7a and 7b at each end of the rails a small distance from the respective rollers. These shoulders are curved at their inner corners to provide a smooth blending of their top surfaces with the top surfaces of the respective rails. The function of these shoulders will appear hereinafter.

A pair of cylindrical bearings 11 and 12, each having a body portion 13 equipped with a supporting pin 14 on each end, are seated for free rotation within the slots by passing the supporting pins into the slots. The bearing 11 seats in the slots 8 and the bearing 12 seats in the slots 9. The diameter of the body portion is such that when the bearing is in place a portion of it will extend beyond the inner surface 9 of the rails (Figure 2) a distance sufficient to enable the hereinafter mentioned shaft to clear the adjacent surfaces of the rails.

Resting upon the bearings is a cylindrical, here tubular, shaft 15. This shaft is the material supporting member of the dispenser and is mounted on the bearings 11 and 12 for free rotation. The end of the shaft extends beyond the housing 2. Outboard of the housing 2 a ring 16 is fastened to the shaft by welding, brazing or other suitable attachment means. This ring provides a ridge of sufficient radial extent beyond the surface of the roller that it will not pass through the gap existing between the shaft 15 and the rails 7 and serves as a stop to limit axial movement of the shaft when it contacts the rail 7. At a point substantially centrally located between the rails 7, the shaft 15 is provided with four circular openings 17 equally spaced around the periphery of the shaft. The pin 18 passes through these openings 17 and is of sufficient length to contact the straight portion 5 of the housing and to project beyond the opposite side of the shaft. The head 19 prevents the pin from passing too far through the shaft. A chain 20 permanently attaches the pin 18 to the frame 1.

The various parts of my bearing assembly are made from suitable shapes of steel sections and with the exception of the roller, bearings, and frame they may be conveniently formed by stamping and bending.

In operation, the rollers 11 and 12 support the shaft 15 for free rotation. When the shaft 14 is motionless the roller 11 sustains a larger portion of the burden than the roller 12. When the material on the roller is being pulled off, thus imparting a vector of force onto the shaft somewhat away from the frame, the primary portion of the burden will shift to the roller 12. By placing it further away from the vertical centerline of the shaft, support is provided nearer the resultant of the vector of force representing the weight of the roll and the vector of force resulting from the unwinding process and the tendency of the shaft to pivot around the outward roller, here the roller 9, is eliminated. The shaft is thereby prevented from leaving its bearing seat and becoming jammed. This spacing of the bearings provides support for the shaft under both loading conditions, namely, at rest and unwinding, without the necessity of adding a third bearing designed to act under only one of the loading conditions.

To drop the shaft 15 into the receptacle provided by the curved upper surface of the rails in such a manner that it will strike the bearings directly and with its full weight will require that it be so dropped with great exactness. In normal use such exactness will seldom, if ever, occur so that the usual happening will be that the shaft will, if the roll be dropped, strike first upon one of the shoulders 7a or 7b and then roll into place on the bearings. Thus, solid members, namely, the rails, welded solidly to the housing and thence mounted solidly to the frame, will receive the first shock of any careless or deliberate dropping of the roll into place and the load on the bearings will seldom, if ever, be materially more than the dead weight of the full roll. This greatly preserves the life of the bearings and minimizes wear and breakage thereof.

The length of the rollers 11 and 12 provide a large bearing surface to absorb both the load and the wear incident to the use of the dispenser.

When the desired amount of material has been unrolled, further movement by the shaft is prevented by reinsertion of the pin 18 with the head end of it resting against the straight portion of the housing 5 (Figure 2).

The preferred embodiment of my invention described above may be modified by providing additional bearings or by mounting the bearings permanently in the bearing housing instead of in open slots as here shown. Another modification may be made by varying the type of material used. Various other modifications of this described construction will be immediately apparent to persons acquainted with equipment of this type and accordingly the hereafter appended claims should be interpreted to cover such modifications and variations excepting as said claims by their own terms expressly require otherwise.

I claim:

1. In a dry goods dispenser having a frame, a roll supporting shaft and means rotatably supporting said shaft on said frame comprising: a hook-shaped housing open at its upper side supported on said frame, said hook extending perpendicularly therefrom; a pair of semi-circular spaced rails mounted on said housing within said hook, each at a right angle to said frame and having openings therein spaced unequally away from the vertical centerline of said shaft, the opening nearest the frame being closest to the said housing centerline; a pair of elongated bearings mounted in said openings; said roll supporting shaft being seated upon said bearings and adapted for free rotation; means on one end of said shaft for selectively holding said shaft against rotation.

2. In a dry goods dispenser having a frame, a roll supporting shaft and means rotatably supporting said shaft on said frame comprising: a hook-shaped housing open on its upper side rigidly attached to said frame and extending perpendicularly away from said frame; a pair of rails spaced a substantial distance apart, each constituting a semi-circular segment of a ring and mounted on said housing, within said hook, at a right angle to said frame and each having a pair of bearing receiving openings therein each opening of said pair removed from the vertical centerline of said shaft an unequal distance, the opening nearest the frame being closest to the vertical centerline of said housing; a pair of elongated cylindrical bearings mounted in said openings; said roll supporting shaft being seated upon said bearings and adapted for free rotation; a ridge surrounding said shaft and arranged to limit axial movement of said shaft relative to said rails.

3. A bearing for a dry goods dispenser having a frame and vertically spaced rolls of material mounted thereon, and adapted for unwinding said material in one direction, said bearing comprising: a hook-shaped housing open on its upper side, the plane of said hook being perpendicular to the axis of said rolls; a pair of rails spaced a substantial distance apart, each constituting the semi-circular segment of a ring, mounted within the hook of said housing, both parallel to the plane of said hook and having bearing receiving openings therein adjacent the radially inward surfaces thereof; a pair of elongated cylindrical bearings extending beyond the radially inward edges of said rails; pins on each end of said bearings received into said openings holding said bearing rotatably in place; a material supporting shaft rotatably seated upon said bearings; the bearing supporting said shaft in the direction of rotation of said shaft when said material is unwound being removed from the vertical centerline of said shaft a greater distance than the bearing supporting said shaft on the other side of said centerline, and both of said bearings positioned to hold said shaft spaced a selected clearance distance from said rails; ends on said shaft projecting outwardly from said bearing in a direction away from said rolls of material; a radially projecting ring surrounding said shaft and rigidly attached thereto between said outwardly projecting end and said bearing and extending from the surface of said shaft a distance greater than said clearance distance; whereby endwise movement of the shaft is positively limited and the shaft will be firmly supported in both unrolling and rest positions.

4. In a dry goods dispenser having a frame, a roll supporting shaft and means rotatably supporting said shaft on said frame comprising: a hook-shaped housing open on its upper side rigidly attached to said frame and extending perpendicularly away from said frame; a pair of rails spaced a substantial distance apart each constituting a semi-circular segment of a ring and mounted on said housing, within said hook, at a right angle to said frame and each having a pair of bearing receiving openings therein each opening of said pair being removed from the vertical centerline of said shaft an unequal distance with respect to the other opening, the opening nearest the frame being closest to the vertical centerline of said housing; a pair of elongated cylindrical bearings mounted in said openings; said roll supporting shaft being seated upon said bearings and adapted for free rotation; the radially inward surface of each of said rails being radiused outwardly and adapted for acting as a shaft guide; a ridge surrounding said shaft and arranged to limit axial movement of said shaft relative to said rails; a plurality of pairs of aligned holes through one end of said shaft substantially midway between said pair of rails adjacent that end of said shaft; a pin adapted removably to pass through a pair of said holes and to bear on one of its ends against said housing.

LEWIS A. GEISTERT.

REFERENCES CITED

The following references are of record in the file of this patent:

UNITED STATES PATENTS

| Number | Name | Date |
|---|---|---|
| 384,023 | Corbett | June 5, 1888 |
| 425,011 | Talbert | Apr. 8, 1890 |
| 449,109 | Devore | Mar. 31, 1891 |
| 521,111 | Haagen | June 5, 1894 |
| 723,678 | Keim et al. | Mar. 24, 1903 |

FOREIGN PATENTS

| Number | Country | Date |
|---|---|---|
| 516,528 | France | Dec. 8, 1920 |